(12) United States Patent
Gurbuz et al.

(10) Patent No.: US 11,301,672 B2
(45) Date of Patent: Apr. 12, 2022

(54) RADAR-BASED METHODS AND APPARATUS FOR COMMUNICATION AND INTERPRETATION OF SIGN LANGUAGES

(71) Applicant: The Board of Trustees of The University of Alabama, Tuscaloosa, AL (US)

(72) Inventors: Sevgi Zubeyde Gurbuz, Tuscaloosa, AL (US); Ali Cafer Gurbuz, Tuscaloosa, AL (US); Chris Crawford, Fosters, AL (US); Darrin Griffin, Tuscaloosa, AL (US)

(73) Assignee: The Board of Trustees of The University of Alabama, Tuscaloosa, AL (US)

( * ) Notice: Subject to any disclaimer, the term of this patent is extended or adjusted under 35 U.S.C. 154(b) by 47 days.

(21) Appl. No.: 16/850,664

(22) Filed: Apr. 16, 2020

(65) Prior Publication Data
US 2020/0334452 A1    Oct. 22, 2020

Related U.S. Application Data

(60) Provisional application No. 62/834,760, filed on Apr. 16, 2019.

(51) Int. Cl.
*G06K 9/00* (2006.01)
*G06K 9/36* (2006.01)
(Continued)

(52) U.S. Cl.
CPC .......... *G06K 9/00355* (2013.01); *G01S 7/415* (2013.01); *G01S 7/417* (2013.01); *G06K 9/36* (2013.01); *G06K 9/6289* (2013.01)

(58) Field of Classification Search
CPC .... G06K 9/00355; G06K 9/36; G06K 9/6289; G01S 7/415; G01S 7/417
See application file for complete search history.

(56) References Cited

U.S. PATENT DOCUMENTS

| 9,921,660 | B2 | 3/2018 | Poupyrev |
| 2018/0075659 | A1* | 3/2018 | Browy ................. G06F 1/1686 |
| 2020/0302210 | A1* | 9/2020 | Santra ..................... G01S 7/415 |

FOREIGN PATENT DOCUMENTS

WO     2016022764     2/2016

OTHER PUBLICATIONS

Lang, Simon, Marco Block, and Raúl Rojas. "Sign language recognition using kinect." International Conference on Artificial Intelligence and Soft Computing. Springer, Berlin, Heidelberg, 2012.
(Continued)

*Primary Examiner* — David F Dunphy
(74) *Attorney, Agent, or Firm* — Meunier Carlin & Curfman LLC

(57) ABSTRACT

Disclosed herein are methods, apparatus and computer program product for radar-based communication and interpretation of sign languages such as American Sign language (ASL) comprising detecting, using a radar system comprising a computing device, sign language gestures, wherein said detected sign language gestures comprise radar data; analyzing the radar data using a trained neural network executing on the computing device to determine word or phrases intended by the sign language gestures; and outputting the determined words or phrases in a visible or audible format.

18 Claims, 11 Drawing Sheets stop
Signing "stop" repeatedly wave goodbye
Waving "good bye" repeatedly

(51) Int. Cl.
*G06K 9/62* (2006.01)
*G01S 7/41* (2006.01)

(56) References Cited

OTHER PUBLICATIONS

Molchanov, Pavlo, et al. "Multi-sensor system for driver's hand-gesture recognition." 2015 11th IEEE international conference and workshops on automatic face and gesture recognition (FG). Vol. 1. IEEE, 2015.

Wang, Saiwen, et al. "Interacting with soli: Exploring fine-grained dynamic gesture recognition in the radio-frequency spectrum." Proceedings of the 29th Annual Symposium on User Interface Software and Technology. 2016, 851-860.

Lien, Jaime, et al. "Soli: Ubiquitous gesture sensing with millimeter wave radar." ACM Transactions on Graphics (TOG) 35.4 (2016): 1-19, Article 142.

W.C. Stokoe, "Sign language structure: Outline of the visual communication American Deaf Studies" in Linguistics: Occasional Papers, 8, 1-75, 1960.

J. Galka, M. Maisor, M. Zaborski, and K. Barczewska, "Inertial Motion Sensing Glove for Sign Language Gesture Acquisition and Recognition", IEEE Sensor Journal, vol. 16, No. 16, pp. 6310-6316, Aug. 15, 2016.

Tubaiz, Noor, Tamer Shanableh, and Khaled Assaleh. "Glove-based continuous Arabic sign language recognition in user-dependent mode." IEEE Transactions on Human-Machine Systems 45.4 (2015): 526-533.

B. Tekeli, S. Z. Gurbuz, and M. Yuksel, "Information-Theoretic Feature Selection for Human Micro-Doppler Signature Classification," in IEEE Transactions on Geoscience and Remote Sensing, vol. 54, No. 5, pp. 2749-2762, May 2016.

B.G. Lee and S. M. Lee, "Smart Wearable Hand Device for Sign Language Interpretation System with Sensors Fusion," in IEEE Sensors Journal, vol. 18, No. 3, pp. 1224-1232, Feb. 1, 2018.

\* cited by examiner

RADAR-BASED METHODS AND APPARATUS FOR COMMUNICATION AND INTERPRETATION OF SIGN LANGUAGES

CROSS REFERENCE TO RELATED APPLICATION

This application claims priority to and benefit of U.S. Provisional Patent Application Ser. No. 62/834,760 filed Apr. 16, 2019, which is fully incorporated by reference and made a part hereof.

BACKGROUND

Much of today's current technologies are designed assuming the users can see, speak, and hear. However, many members of the Deaf community have little or no capability of auditory recognition of speech, even with the use of hearing aids, and, in turn, their speech may also be affected so as to be difficult to understand in comparison to the speech of a hearing person. The primary mode of communication in the Deaf community is Sign Language, which also relies on gestures and non-verbal communication, including general hand signals, head/body movement and facial expressions, which are critical in the grammar of sign languages.

For this purpose, existing conventional technologies have primarily focused on video exploitation. However, video has some disadvantages because it requires an external light source (cannot work during the night or in dark spaces) and can potentially capture private visual images, thus precluding its use in personal spaces, such as bathrooms, bedrooms, or medical/assisted living facilities. Other conventional technologies have focused on wearable sensors (e.g., gloves, etc.), but it may not be practical to always carry (or wear) the sensors when needed.

Many people who are Deaf or hard of hearing rely on visual-spatial languages such as American Sign Language (ASL) to communicate and interact with others. Linguists have recognized that ASL possesses the essential characteristics of phonology, morphology, syntax, semantics, and pragmatics to be considered a full and true language (Stokoe, 1960; Stokoe, 1965) (W. C. Stokoe, "Sign language structure: Outline of the visual communication systems of the American Deaf Studies" in Linguistics: Occasional Papers, 8, 1-75, 1960 and W. C. Stokoe, D. C. Casterline, and C. G. Croneberg, "A dictionary of American Sign Languages on linguistic principles", Washington, D.C.: Gallaudet College Press 1965, both of which are incorporated by reference). Previous to Stokoe's works, sign language in the U.S. was believed to be a system of gestures or pantomime that transformed English into a visual-spatial modality. Even though ASL and English share the same geographic areas and users often overlap in demographic characteristics, these languages are mutually exclusive and linguistically diverse. For people who are Deaf, a heavy reliance on visual communication, unique sensory input, and the use of a minority language develops common meanings and viewpoints. The socio-cultural dynamics that stem from a visual life foster strong social ties among people who are Deaf; they often refer to themselves as the Deaf community, as living in a Deaf world, or as having a shared Deaf experience-sometimes referred to as Deafhood. These labels exemplify the life, cultural, and linguistic experiences of people who are Deaf which include shared histories, social institutions (e.g., Deaf schools, social clubs, and Deaf theatre and art) and verbal and nonverbal interactional norms. In this way, the experience of deafness is akin to sharing an identity, to be a member of a group of people who often associate their characteristics with pride and positive feelings, rather than those often share by outsiders who tend to use social/disability lens to interpret those perceived as being at a loss.

Research on computer recognition of sign language has heretofore primarily focused on camera-based and wearable technologies, such as gloves or wrist bands containing accelerometers and other sensors. Among these approaches, sensor-augmented gloves have been reported to yield the highest gesture recognition rates. For example, (Galka, 2016) (J. Galka, M. Maisor, M. Zaborski, and K. Barczewska, "Inertial Motion Sensing Glove for Sign Language Gesture Acquisition and Recognition", IEEE Sensor Journal, vol. 16, no. 16, pp. 6310-6316, Aug. 15, 2016, incorporated by reference) reports achieving 99.75% recognition accuracy of 40 different gestures by fusing data from accelerometers placed on the fingers and classifying with parallel hidden Markov models. Another group working on Arabic sign language recognition, reported similarly high rates of accuracy using DG5-VHand data gloves containing five embedded bend sensors and a three-axes accelerometer: namely, 98.9% recognition of 40 sentences formed from an 80-word lexicon (Tubaiz, 2015) (B. Tekeli, S. Z. Gurbuz, and M. Yuksel, "Information-Theoretic Feature Selection for Human Micro-Doppler Signature Classification," in IEEE Transactions on Geoscience and Remote Sensing, vol. 54, no. 5, pp. 2749-2762, May 2016, incorporated by reference). Other forms of wearables have also been pursued, including the use of arm-mounted surface electromyographyic (sEMG) sensors together with accelerometers to achieve 96.5% correct recognition of a 120 sign vocabulary and 86.7% recognition of 200 sentences. More recently, a hand-worn system of five flex sensors, two pressure sensors and three inertial motion sensors was used to recognize signs of the ASL alphabet at an accuracy of 98.2% (Lee, 2018) (B. G. Lee and S. M. Lee, "Smart Wearable Hand Device for Sign Language Interpretation System with Sensors Fusion," in IEEE Sensors Journal, vol. 18, no. 3, pp 1224-1232, Feb. 1, 2018, incorporated by reference).

Moreover, although video tends to be viewed highly favorably for interpersonal communication with society-at-large, it has its limitations—video usage was dependent upon being in an office/work environment or with access to cell phones. This is especially problematic in emergency situations, such as natural disasters, incidents involving police, medical, or service providers, where traditional video communication can be limited in assistance. There are also concerns over technology enabling invasion of privacy and potential surveillance of their personal and private lives.

Therefore, methods, apparatus and systems are desired that improve the communication and interpretation of sign languages and that overcome challenges in the art, some of which are described above.

SUMMARY

Radar, as described herein, possesses unique advantages that can be used to enable interpretation of sign language in situations where video cannot be used or performance is limited. Radar is a sensor that can detect patterns of motion, without acquiring private images. Because it transmits its own RF electromagnetic signal, it is not dependent on any external illumination. Radar antennas can be designed to illuminate in all directions (360 degrees), so sensing is possible in situations when video cannot directly view the signing individual.

In some aspects, embodiments are disclosed herein comprised of multiple sensing nodes, which include a 3D camera (or video camera with infrared depth sensor) working in concert with radar to facilitate the linguistic recognition/interpretation of Deaf communications via sign language. Radar enables the system to understand Deaf linguistic communications without having to be directly in front of the video camera or screen. By use of a wide-angle or omni-directional antenna, radar can enable recognition in all/most directions (i.e. 360 degrees), even when video cannot observe the individual. Moreover, radar does not require lighting or illumination, thus it is the primary basis of recognition when there is no lighting available in a multi-sensing system. When the video camera can function, radar is used in fusion with the 3D video imagery to recognize and interpret facial expressions, non-verbal gestures, and hand movements during Deaf communications. The inclusion or exclusion of relevant sensors can be dictated by levels of needed privacy; e.g., radar-only operation in high privacy settings will be possible.

The systems and devices disclosed herein output the interpretation results in the form of any media; e.g. visual symbology, text, or other desired interface, such as speech or video/hologram/visual recreation/virtual reality of the observed communications.

Disclosed herein are methods, apparatus and computer program products for radar-based communication and interpretation of sign languages comprising: detecting, using a radar system comprising a computing device, sign language gestures, wherein said detected sign language gestures comprise radar data; analyzing the radar data using a trained neural network executing on the computing device to determine word or phrases intended by the sign language gestures; and outputting the determined words or phrases in a visible or audible format.

In some instances, the visible format comprises text, which can be displayed on a display, wherein the display is a display associated with a computer, a smart phone, a portable electronic device, and the like.

Alternatively or optionally, in some instances the visible format comprises a graphical representation. For example, the graphical representations may comprise emojis and/or pictorial symbols, and the like.

Alternatively or optionally, the audible format comprises computer-generated audible words. The computer-generated audible words may be generated in any language desired. The computer-generated audible words may be played through a speaker associated with a computer, a smart phone, a portable electronic device, and the like.

In some instances, analyzing the radar data using a trained neural network executing on the computing device to determine word or phrases intended by the sign language gestures comprises a dynamic classification scheme. For example, the dynamic classification scheme may comprise decomposition of the radar data into gross and fine movements using time-frequency-range analysis of radar measurements; analysis of the radar data across multiple domains including time-frequency, time-range, and 3D representations; modeling of time-varying nature of radar data using recurrent neural networks (RNN); recognition of sequences of gestures; enforcement of certain rules that constrain potential sequences of gestures, and enable identification of transition periods between gestures or sequences of gestures.

In some instances, the time-frequency-range analysis of radar measurements may comprise cepstral filtering.

In some instances, recognition of sequences of gestures may be performed using Connectionist Temporal Classification (CTC).

In some instances, detecting sign language gestures using the radar system comprising a computing device, wherein the detected sign language gestures comprise radar data, comprises detecting the sign language gestures using a plurality of radar systems. In some instances, the plurality of radar systems each observe the sign language gestures from different angles.

In some instances, the sign language gestures are also captured using an image capture device. Image data from the image data device is processed by the computing device and used with the radar data to determine the word or phrases intended by the sign language gestures.

In some instances, the image capture device comprises a plurality of image capture devices. In some instances, the plurality of image capture devices each capture the sign language gestures from different angles.

The sign language gestures may comprise American Sign Language gestures and/or other forms of sign language.

It should be understood that the above-described subject matter may also be implemented as a computer-controlled apparatus, a computer process, a computing system, or an article of manufacture, such as a computer-readable storage medium.

Other systems, methods, features and/or advantages will be or may become apparent to one with skill in the art upon examination of the following drawings and detailed description. It is intended that all such additional systems, methods, features and/or advantages be included within this description and be protected by the accompanying claims.

BRIEF DESCRIPTION OF THE DRAWINGS

The components in the drawings are not necessarily to scale relative to each other. Like reference numerals designate corresponding parts throughout the several views.

DETAILED DESCRIPTION

Figure 1:
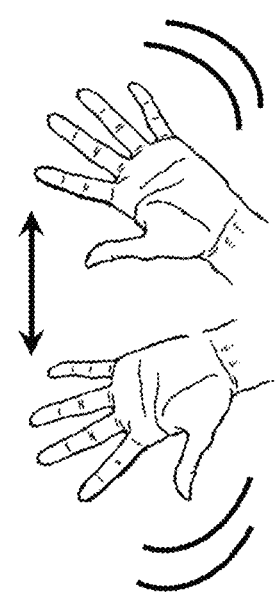
FIG. 1 illustrates an example of radar spectrograms (i.e., radar data) for several different hand gestures.
Figure 1:
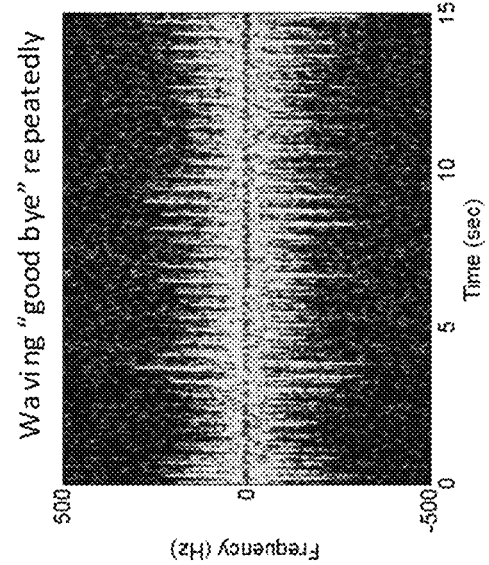
Figure 1:
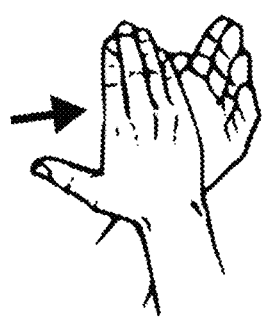
Figure 1:
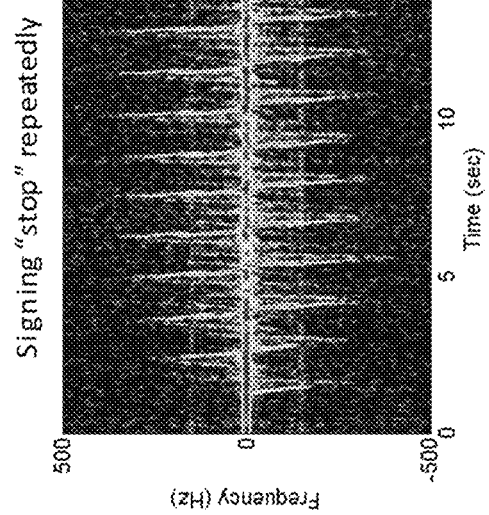

Unless defined otherwise, all technical and scientific terms used herein have the same meaning as commonly understood by one of ordinary skill in the art. Methods and materials similar or equivalent to those described herein can be used in the practice or testing of the present disclosure.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the Examples included therein and to the Figures and their previous and following description.

The general concept of radar is to transmit an electromagnetic wave over a certain range of frequencies and analyze the radar return signals. Radar estimates the distance to an object by measuring the time it takes for the transmitted signal to reach the object and return, and the instantaneous velocities and accelerations of different parts of moving objects by measuring the time-dependent frequency shifts of the wave scattered by the object, known as the Doppler effect. Subtle differences in human motion can result in discriminable and unique patterns in the time-frequency representation of the radar Doppler signal, referred to as micro-Doppler. The traditional classification process typically involves extraction of a set of features from the time-frequency data, and subsequently supplying these features to a classifier. However, most recently, advances in machine learning, parallelization and GPUs have made feasible the design of deep neural networks (DNNs) and enabled the achievement of record performances in image and natural language processing. This, in turn, has motivated the investigation of DNNs for radar signal classification, with the first publications on the use of convolutional neural networks (CNNs) for hand-gesture recognition and human activity recognition, appearing in 2015 and 2016, respectively.

The embodiments disclosed herein are an application of radar for new technologies addressing the communication needs of the Deaf community. As a sensor, its use is described and disclosed herein to recognize hand and body movements that have a time-dependent structure and ascribed meaning due to their use as a mode for communication. An example of radar spectrograms for several different hand gestures is shown in FIG. 1. In FIG. 1, the top row shows two dynamic hand gestures (stop and wave goodbye), while the bottom row shows corresponding radar micro-Doppler spectrograms, plotted for −500 to 500 Hz in frequency (y-axis) and 0 to 15 seconds in duration (x-axis). Notice that the shapes within the radar spectrogram different depending on gesture, enabling machine learning algorithms to identify different gestures. However, pre-processing parameters involved, such as duration, amount of down-sampling, resolution of pixels in the image, in addition to radar parameters, affect the image presented to the DNN and, hence, performance.

Fundamentally, radar data are not image-based snapshots, but are time-varying streams of complex data. DNN architectures that can model these time-varying dependencies have only recently come under consideration. Moreover, the micro-Doppler signature, i.e. radar spectrogram, is not the only way to present the complex I/Q radar data to the DNN, Frequency-Modulated Continuous Wave (FMCW) and ultra-wideband (UWB) radars can also measure range versus time, adding another dimension to the data. In fall detection applications, fusion of the time-frequency domain with the range-time domain have been shown to yield significant improvements in performance. Thus, existing DNN-based approaches for human motion recognition lack fundamental capabilities: 1) clarity and understanding of the most effective radar data domain representations and the pixels or regions in each domain which are most relevant to the classifier, and 2) implementation of dynamic DNN architectures that can capture the unique phenomenology of radar as a continuous stream of frequency and range data, which reflect the underlying kinematics of motion and physics of electromagnetic scattering. Transformational advances in the application of deep learning to radar signal classification will only be possible through integration of RF signal phenomenology with DNN architectures.

Figure 2:
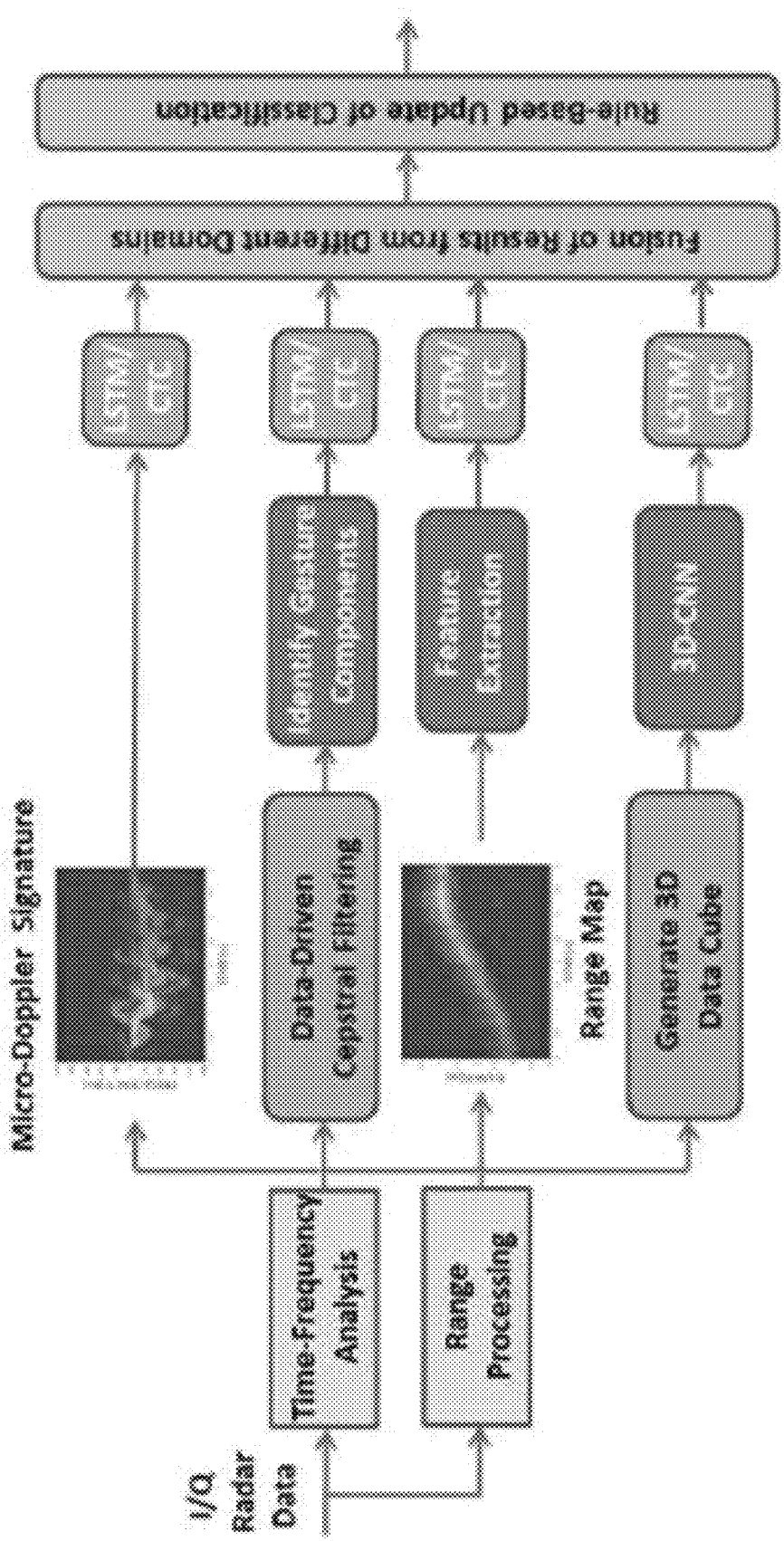
FIG. 2 illustrates a block diagram showing an overall approach towards processing and classifying the radar data from gestures involves multiple layers of processing.

Additionally, ASL involves not just hand movements or gestures, but body movements as well, such as of the torso and arm, which occur even when a person is sitting. These gross motions need to be distinguished from the gesture-related movements to improve recognition accuracy. Thus, the overall approach towards processing and classifying the radar data from gestures involves multiple layers of processing comprising (1) decomposition of the radar measurement into gross and fine movements using frequency-based cepstral filtering; (2) analysis of radar data across multiple domains: time-frequency, time-range, and 3D representations; (3) Modeling of time-varying nature of signal using recurrent neural networks (RNN); recognition of sequences of gestures with, for example, Connectionist Temporal Classification (CTC); and (5) enforcement of certain rules that constrain potential sequences of signs, and enable identification of transition periods between signs. These concepts are shown in the block diagram (FIG. 2) summarizing an embodiment a dynamic classification scheme used by the devices and systems described herein.

Figure 3:
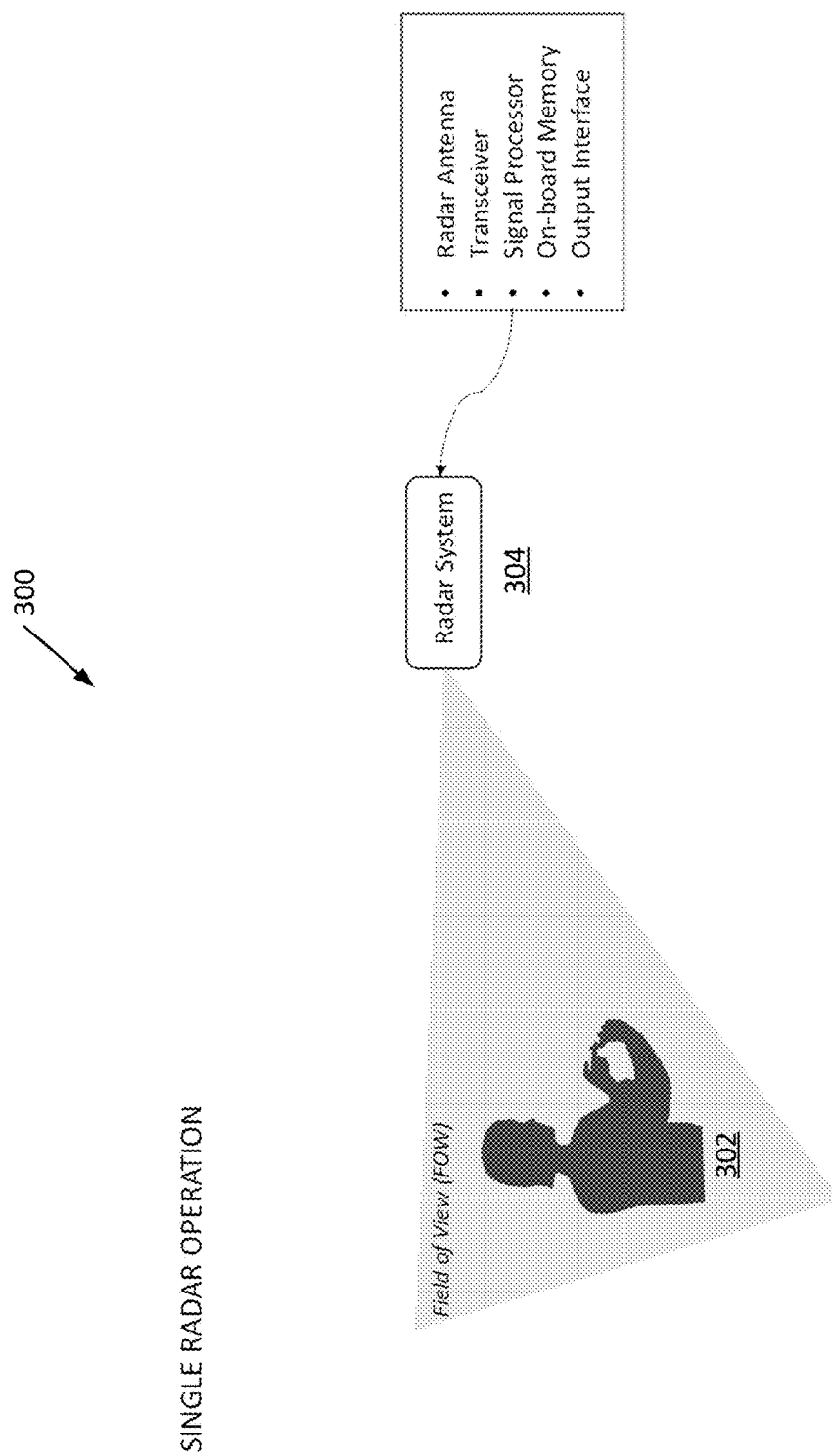
FIG. 3 is an illustration of an exemplary system for radar-based communication and interpretation of sign languages where a person is making gestures associated with a sign language.

FIG. 3 is an illustration of a system 300 for radar-based communication and interpretation of sign languages where a person 302 is making gestures associated with a sign language. A radar system 304 detects the gestures and analyzes the received gesture signals. The received gesture signals are transformed to a visible and/or audible output by a processor associated with the radar system 304. As shown in FIG. 3, basic components of the radar system 304 comprise a radar antenna, a radar transceiver, a signal processor comprising a processing circuit (i.e., a processor), a memory, and an output interface.

Figure 4:
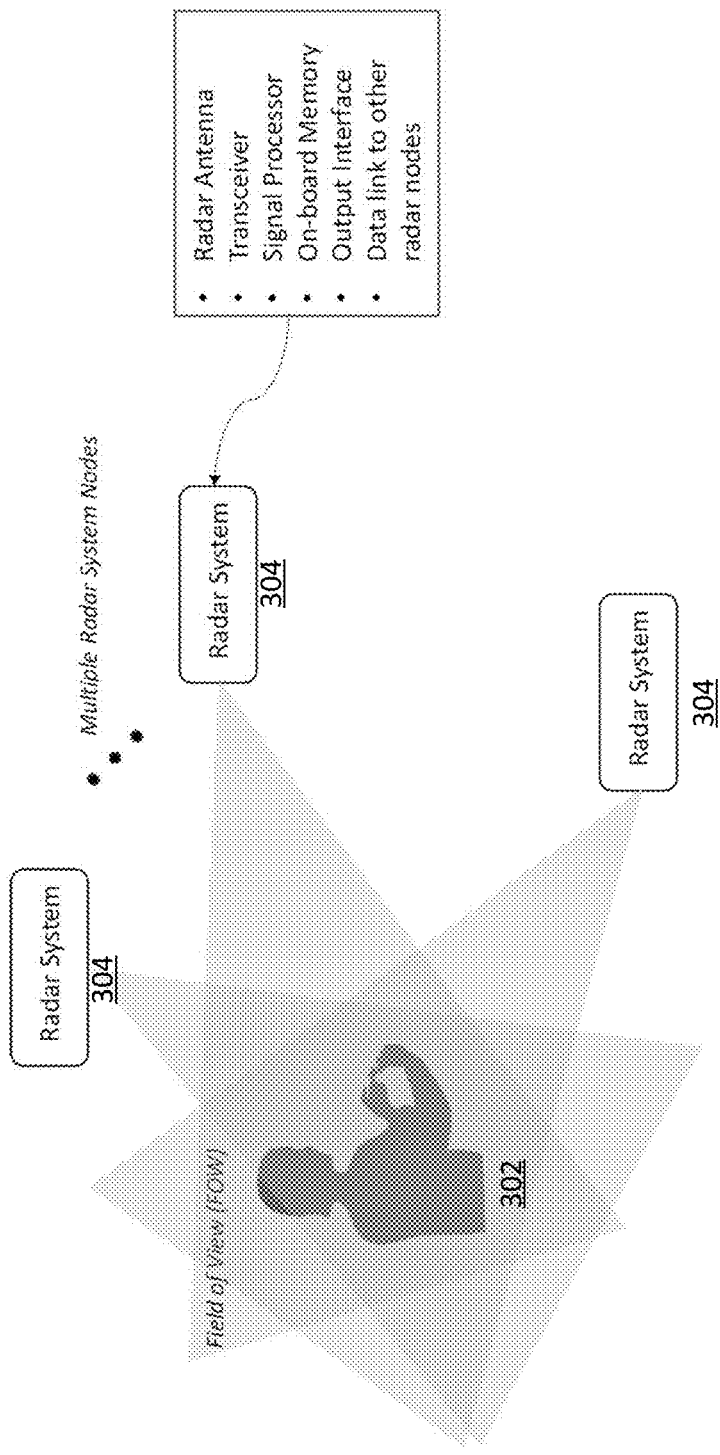
FIG. 4 is an illustration of an alternate system for radar-based communication and interpretation of sign languages.

FIG. 4 is an illustration of an alternate system 400 for radar-based communication and interpretation of sign languages. Similar to FIG. 3, in the illustration of FIG. 4 a person 302 is making gestures associated with a sign language. A plurality of radar systems 304 are used to detect the gestures and analyze the received gesture signals. At least one of the received gesture signals are transformed to a visible and/or audible output by a processor associated with the at least one radar system 304. As with FIG. 3, basic components of each of the plurality of radar systems 304 comprise a radar antenna, a radar transceiver, a signal processor comprising a processing circuit (i.e., a processor), a memory, and an output interface. Alternatively, though not shown in FIG. 4, the system 400 may be comprised of a plurality of radar transceivers (rather than complete radar systems 304) arranged at different angles around the person 302, wherein each of the plurality of radar transceivers are connected to a single signal processor comprising a processing circuit (i.e., a processor), memory, and output interface.

Figure 5:
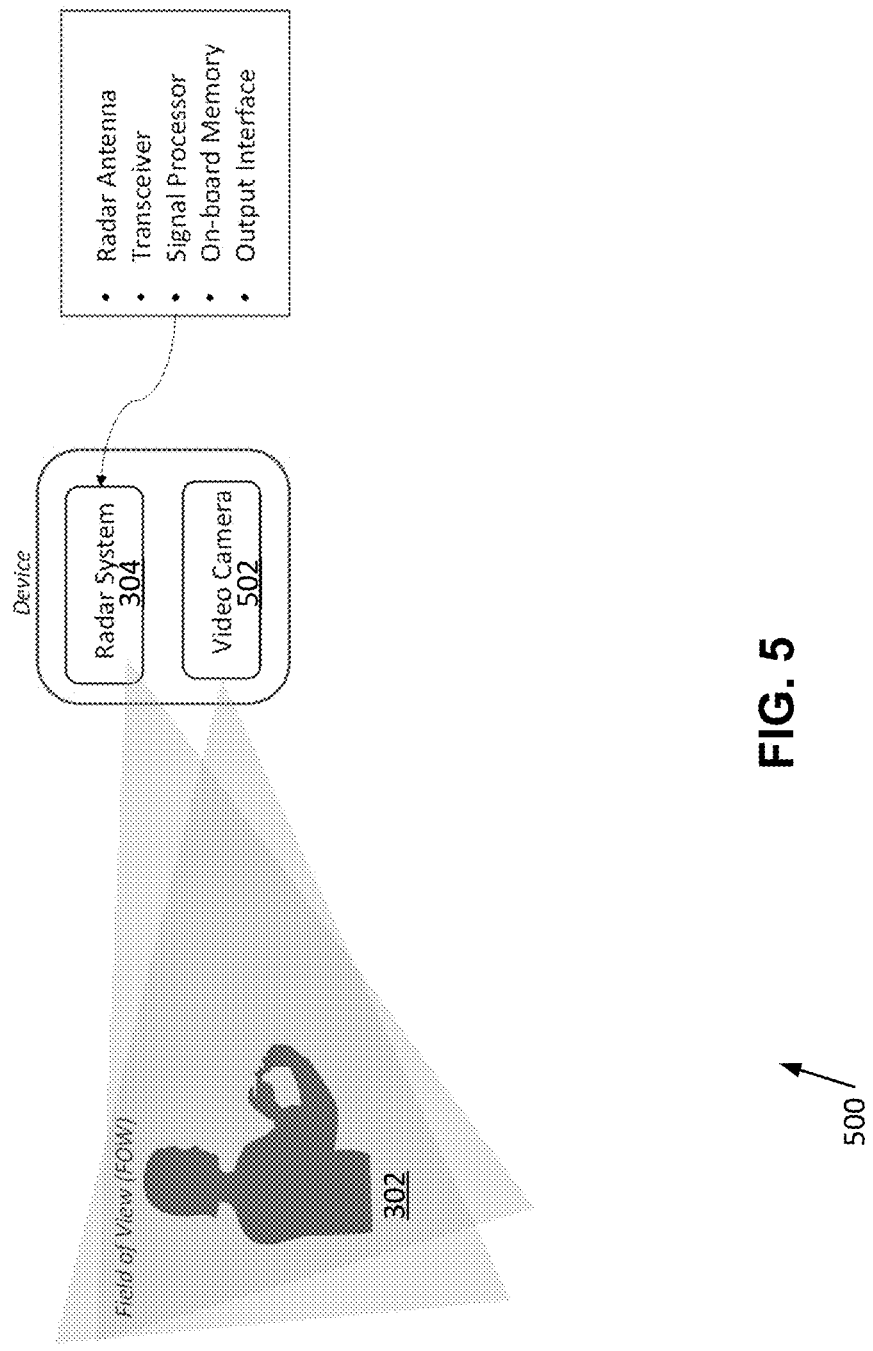
FIG. 5 is an illustration of yet another alternate system for radar-based communication and interpretation of sign languages.

FIG. 5 is an illustration of yet another alternate system 500 for radar-based communication and interpretation of sign languages. In this embodiment, the system 500 is comprised of one or more radar systems 304 and one or more video cameras 502. Similar to FIGS. 3 and 4, in the illustration of FIG. 5 a person 302 is making gestures associated with a sign language. The one or more radar systems 304 are used to detect the gestures using radar data and analyze the received gesture signals. Simultaneously, the one or more video cameras 502 are also detecting the sign language gestures as image data. The received gesture signal data (both radar data and image data) is transformed to a visible and/or audible output by one or more processors associated with the at least one radar system 304 and/or the one or more video cameras 502. As with FIGS. 3 and 4, basic components of the radar systems 304 comprise a radar antenna, a radar transceiver, a signal processor comprising a processing circuit (i.e., a processor), a memory, and an output interface. The processor of the radar system 304 can be used to process the image data and transform it into a visible and/or audible output, or it may be performed by a separate processor. Alternatively, the outputs of the radar data and the image data can be compared to determine if they agree. Fusion logic can be implemented to produce a single output (audible and/or visible) from both the radar data and the image data where the output comprises data from the radar and the image systems when they agree, and one of the radar data and the image data as selected as dominant when they disagree. For example, radar data may be selected for the output if the radar and image data result in two different outputs. Similarly, though alternatively, image data may be selected for the output if the radar and image data result in two different outputs. In yet another alternate, the detected image data and radar data may be buffered in a memory and re-analyzed when the radar and image data outputs are not in agreement. This may be performed several times until an agreement is reached between the radar and image systems. If no agreement is achieved after re-analysis, then the designated dominant system (radar or image) can be used for interpretation of the sign language gestures.

Figure 6A:
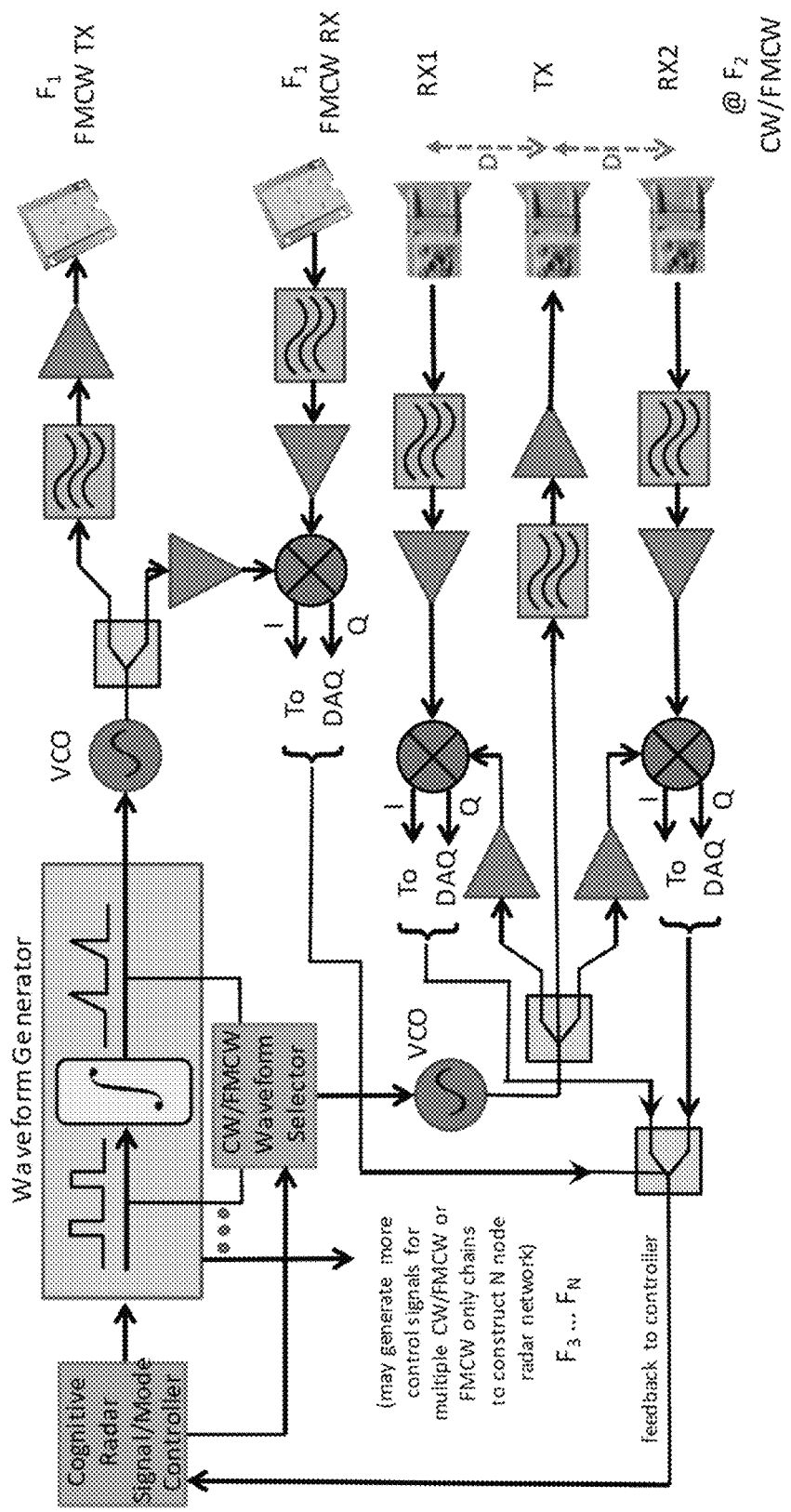
FIG. 6A is an exemplary block diagram of a cognitive dual-mode radar system that can be used in embodiments of systems for radar-based communication and interpretation of sign languages.

FIG. 6A is an exemplary block diagram of a cognitive dual-mode radar system 600 that can be used in embodiments of systems for radar-based communication and interpretation of sign languages. As used herein, "cognitive dual-mode radar" means a radar (RF sensor) network of a single or multiple transmit and receive chains whose transmit waveform is controlled based on feedback of received measurements from each receive chain. Transmit chains may be operated in dual-mode, switching between a continuous wave (CW) or FMCW waveform, or continuously transmit an FMCW waveform only. The frequency transmitted over each chain may differ, using lower frequencies for through the wall operation, or higher frequencies for increased sensitivity. The cognitive radar signal/model controller will include an embedded processor and computations on the received data to make optimum decisions on the waveform to be transmitted on each chain. This decision will be adapted at each coherent processing interval (CPI) to allow for dynamic adaptation on both transmit and receive in the radar network.

Figure 6B:
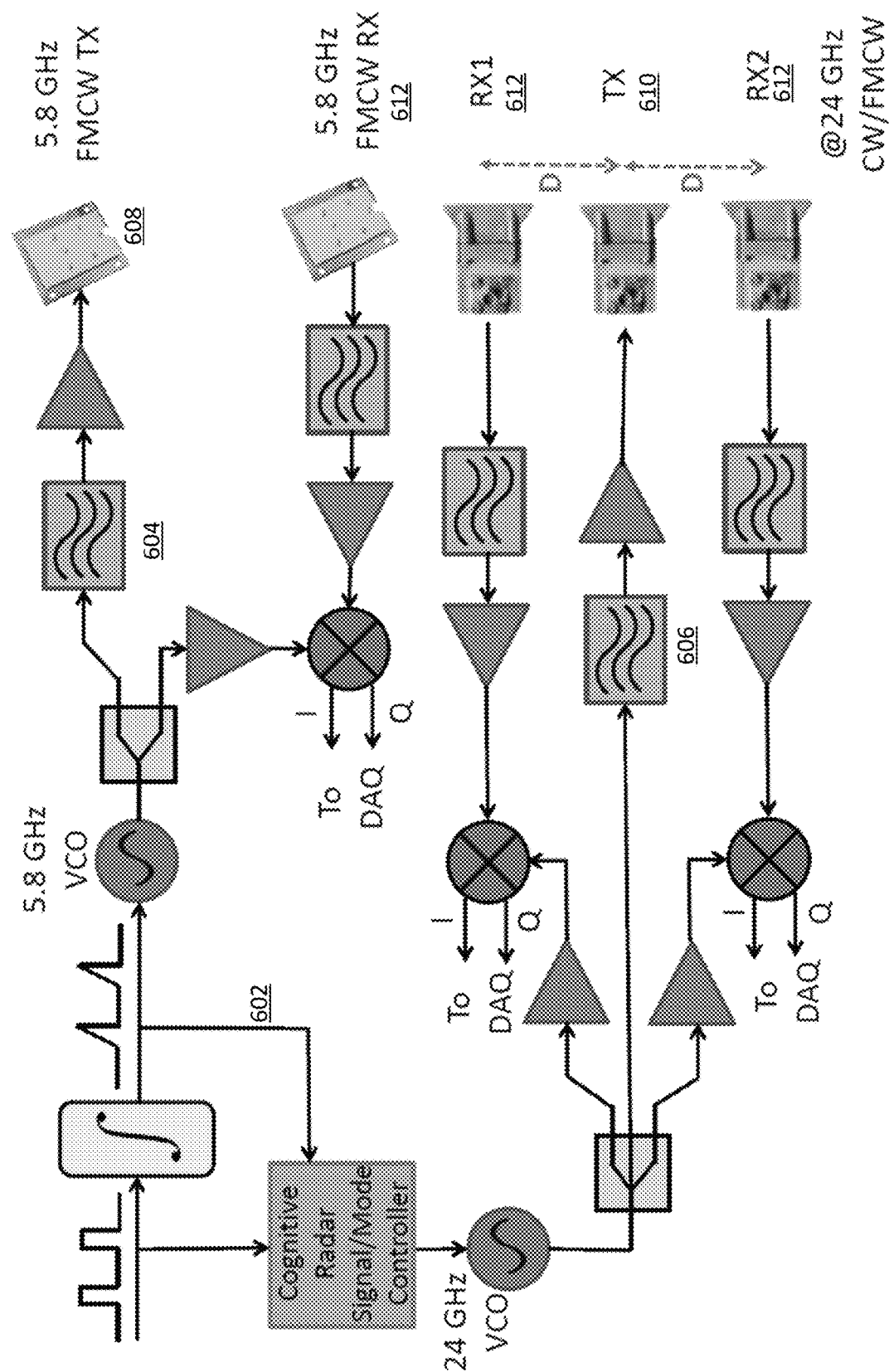
FIG. 6B is a specific non-limiting example of a cognitive dual-mode radar system.

FIG. 6B is a specific non-limiting example of a cognitive dual-mode radar system. As shown in FIG. 6B, one or more voltage controlled oscillators (VCOs) are used to convert an input signal 602 into one or more radar signals 604, 606 that are provided to one or more transmitters 608, 610 and detected by a plurality of radar receivers 612. The detected radar signals from the receivers are compared to the input radar signals 604, 606 and then measured and analyzed using data acquisition (DAQ) with a computer. Specifically, as shown in FIG. 6B, the radar system comprises 5.8 GHz radar VCO, transmitters and receivers and 24 GHz VCO, transmitters and receivers, where the transmitters and receivers (both modes) use FMCW radar and/or CW radar, where FMCW is a special type of radar sensor which radiates continuous transmission power like a simple continuous wave radar (CW-Radar).

Figure 7:
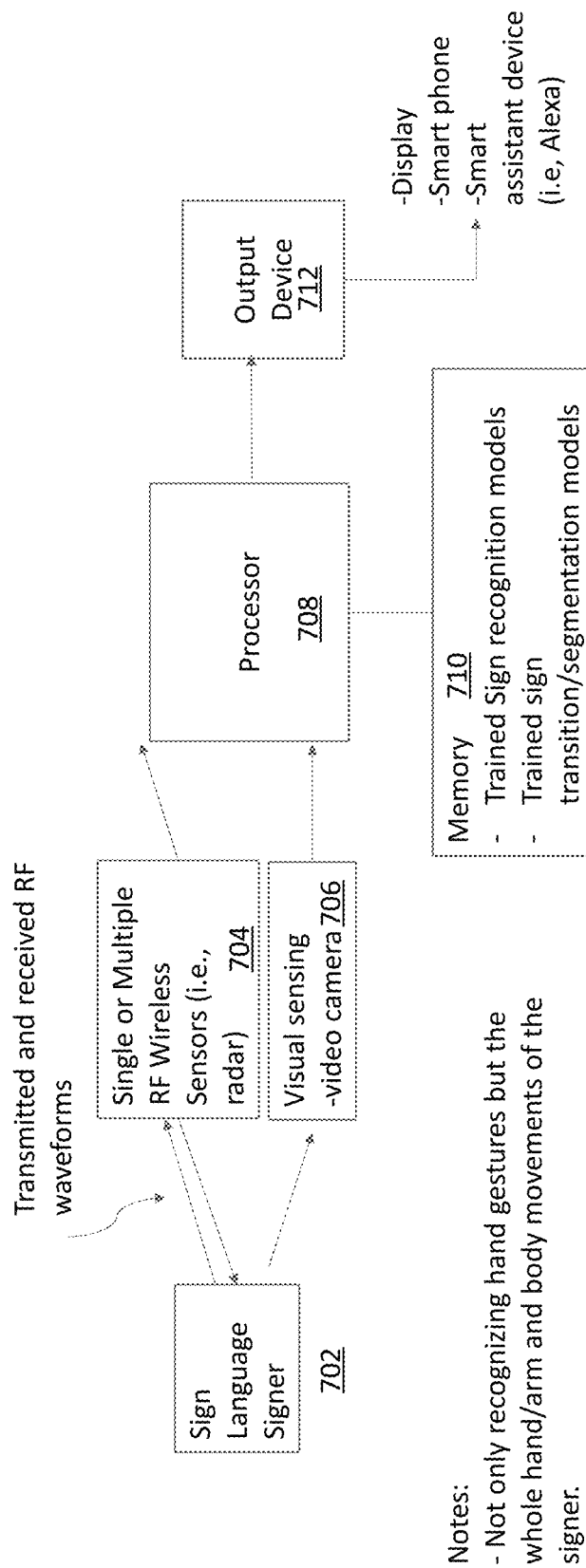
FIG. 7 is a block diagram that illustrates components of a system for radar-based communication and interpretation of sign languages and functions of several of the components.

FIG. 7 is a block diagram that illustrates components of a system for radar-based communication and interpretation of sign languages and functions of several of the components. As shown in FIG. 7, a sign language signer (person) 702 makes gestures associated with a known sign language (e.g., American Sign Language). The gestures are detected by a single or multiple radio-frequency (RF) wireless sensors (i.e., radar) 704 and optionally by visual sensing (i.e., one or more cameras) 706. The radar sensors 704 are configured to not only recognize hand gestures but the entire hand and arm along with body movements of the signer 702. Radar data and (optionally) image data from the radar sensors 704 and cameras 706 is provided to a processor 708. The processor 708 is executing computer-executable instructions stored on a memory 710 associated with the processor 708. The computer-executable instructions comprise deep neural networks (DNNs) that have been trained to recognize sign language gestures including use of sign transition/segmentation models. The analyzed radar and (optionally) image data is converted to visible (text, images, etc.) and/or audible language, which is provided to an output device 712. Exemplary output devices may include a display, a smart-phone, a smart-assistance device (e.g., Alexa, etc.), and the like. In some instances, the visible format may include a graphical representation such as emojis and/or pictorial symbols, and the like.

Figure 8:
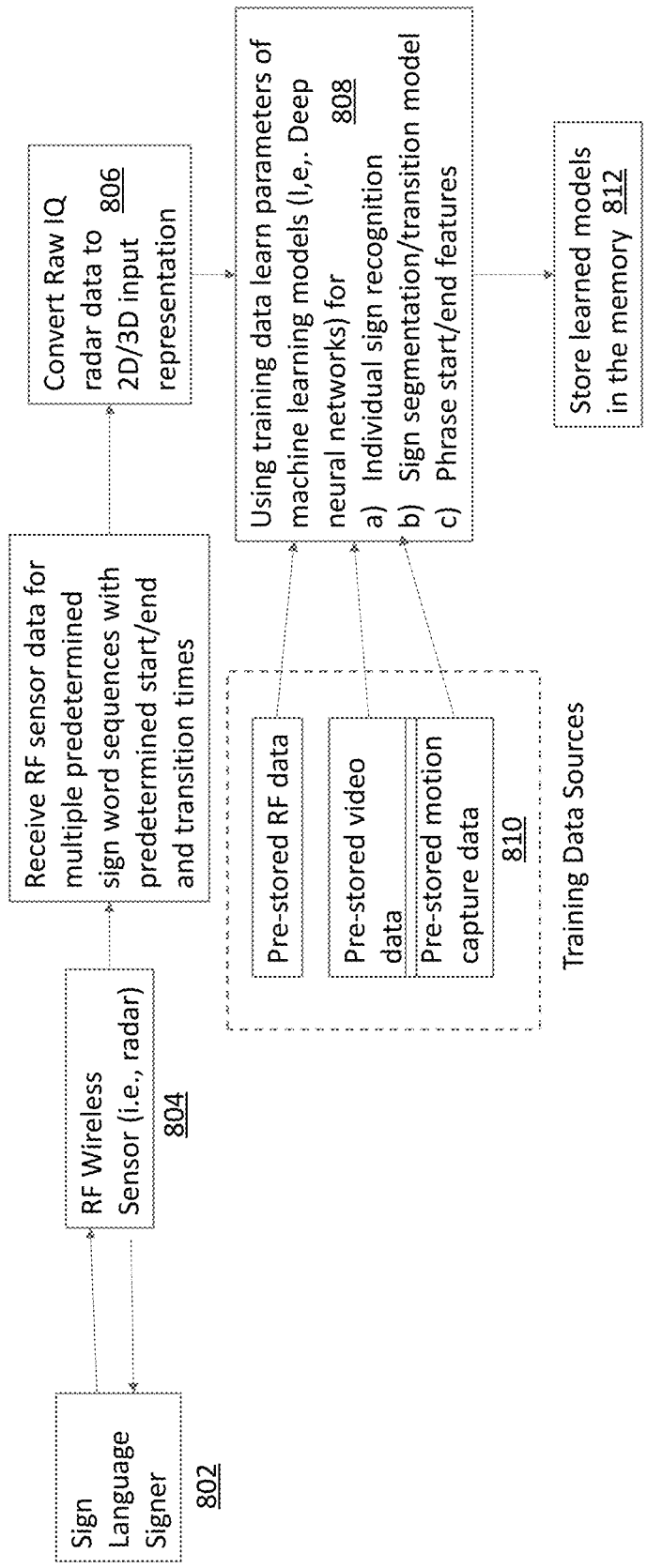
FIG. 8 is a diagram illustrating a process for training a neural network used to analyze sign language gestures using radar or radar and image data to transform the sign language gestures to visible and/or audible outputs representative of the sign language gestures as used in a system for radar-based communication and interpretation of sign languages.

FIG. 8 is a diagram illustrating a process for training a neural network used to analyze sign language gestures using radar or radar and image data to transform the sign language gestures to visible and/or audible outputs representative of the sign language gestures as used in a system for radar-based communication and interpretation of sign languages. A sign language signer 802 executes multiple predetermined sign word sequences with predetermined start/end and transition times. The sequences are detected by a RF wireless sensor (i.e., radar receiver) 804 and the raw in-phase (I) and quadrature-phase (Q) radar data is converted to 2D and/or 3D input representations 806 such as time-frequency representations, e.g., spectrograms or time-frequency, range representations. A deep neural network algorithm (executing on one or more processors) 808 is trained to recognize the sequences using training data sources 810. Training includes training the DNN at least for individual sign recognition, sign segmentation/transition recognition, and phase start/end feature recognition. The trained models are stored 812 in the memory accessible by the processor.

Figure 9:
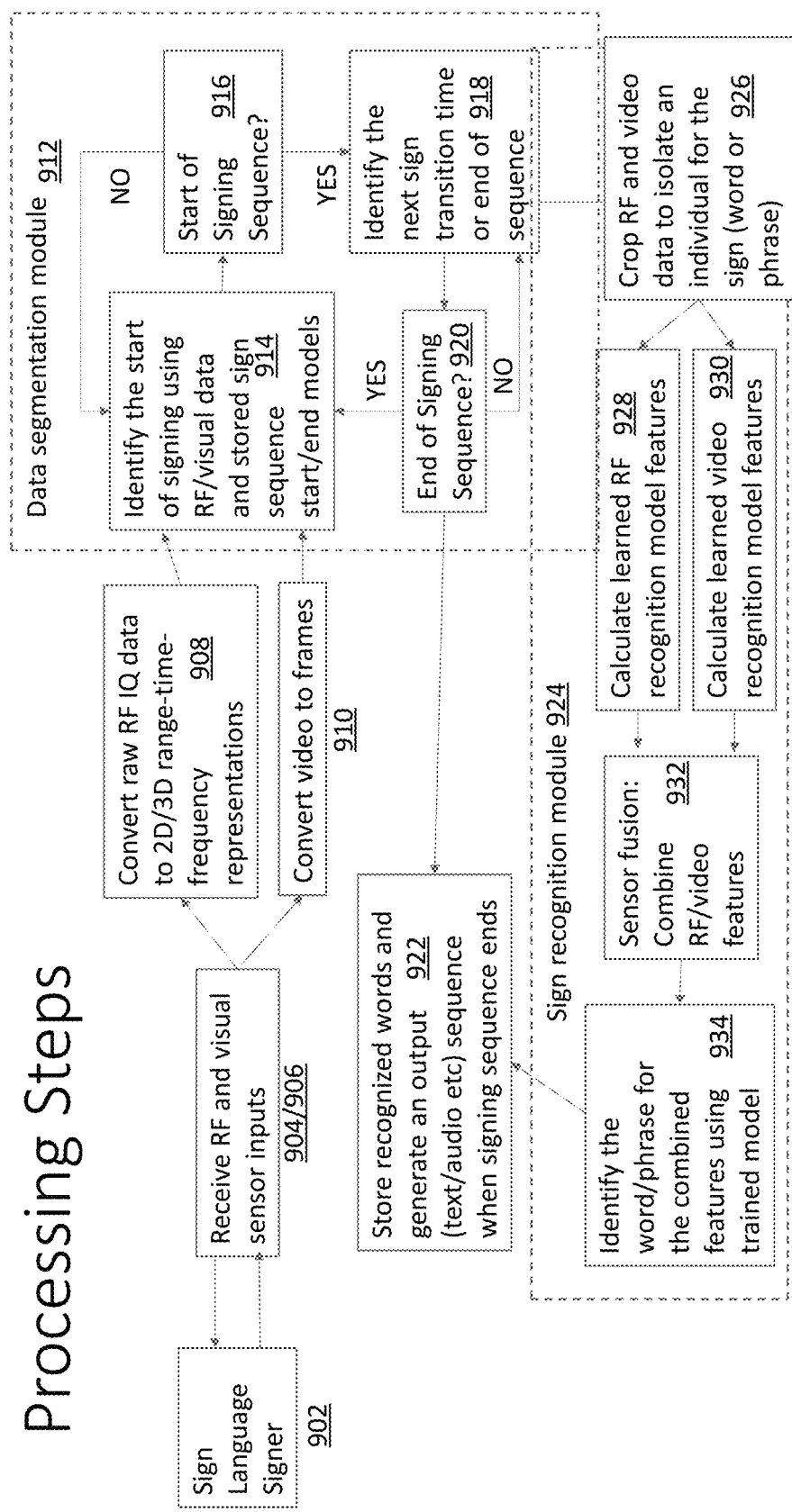
FIG. 9 is a diagram illustrating an exemplary process for processing detected sign language gestures by a radar sensor alone or a radar sensor and a camera as used in a system for radar-based communication and interpretation of sign languages.

FIG. 9 is a diagram illustrating an exemplary process for processing detected sign language gestures by a radar sensor alone or a radar sensor and a camera as used in a system for radar-based communication and interpretation of sign languages. A sign language signer 902 executes sign word sequences each with start/end and transition times. The sequences are detected by a RF wireless sensor (i.e., radar receiver) 904 and (optionally) one or more cameras 906. The raw in-phase (I) and quadrature-phase (Q) radar data is converted to a 2D/3D input representation 908. The optional image data from the camera(s) is converted to frames 910. These conversion processes for both the radar data and the image data is performed by the processor, as further described herein. The processor further executes computer-executable software to perform data segmentation as a data segmentation module 912. The data segmentation process comprises 914 identifying the start of signing using the RF (radar) and/or visual data and stored sign sequence start/end models (see FIG. 8). If at 916 the start of a signing sequence is identified, then at 918 the next sign transition time or end of sequence is identified. If an end of sequence is identified at 920, then the process returns to 914 and at 922 the recognized words are stored in the memory and the output (text/audio, etc.) sequence is generated using a sign recognition module 922 (see below) when the signing sequence ends. If an end of sequence is not identified at 920, the process returns to 918. If at 916 the start of a signing sequence is not identified, then the process returns to 914.

At 918, when the next sign transition time or end of sequence is detected, the process continues to the sign recognition module 924. The process of the sign recognition module 924 comprises 926, cropping RF (radar) and (optionally) video data to isolate an individual sequence for the sign (word or phrase). At 928, learned RF recognition model features are calculated from the radar sequence and (optionally) at 930 learned video recognition features are calculated for the video sequence. At 932, the calculated radar and option video features are combined. At 934, the word/phrase for the combined features are identified using the trained model.

Figure 10:
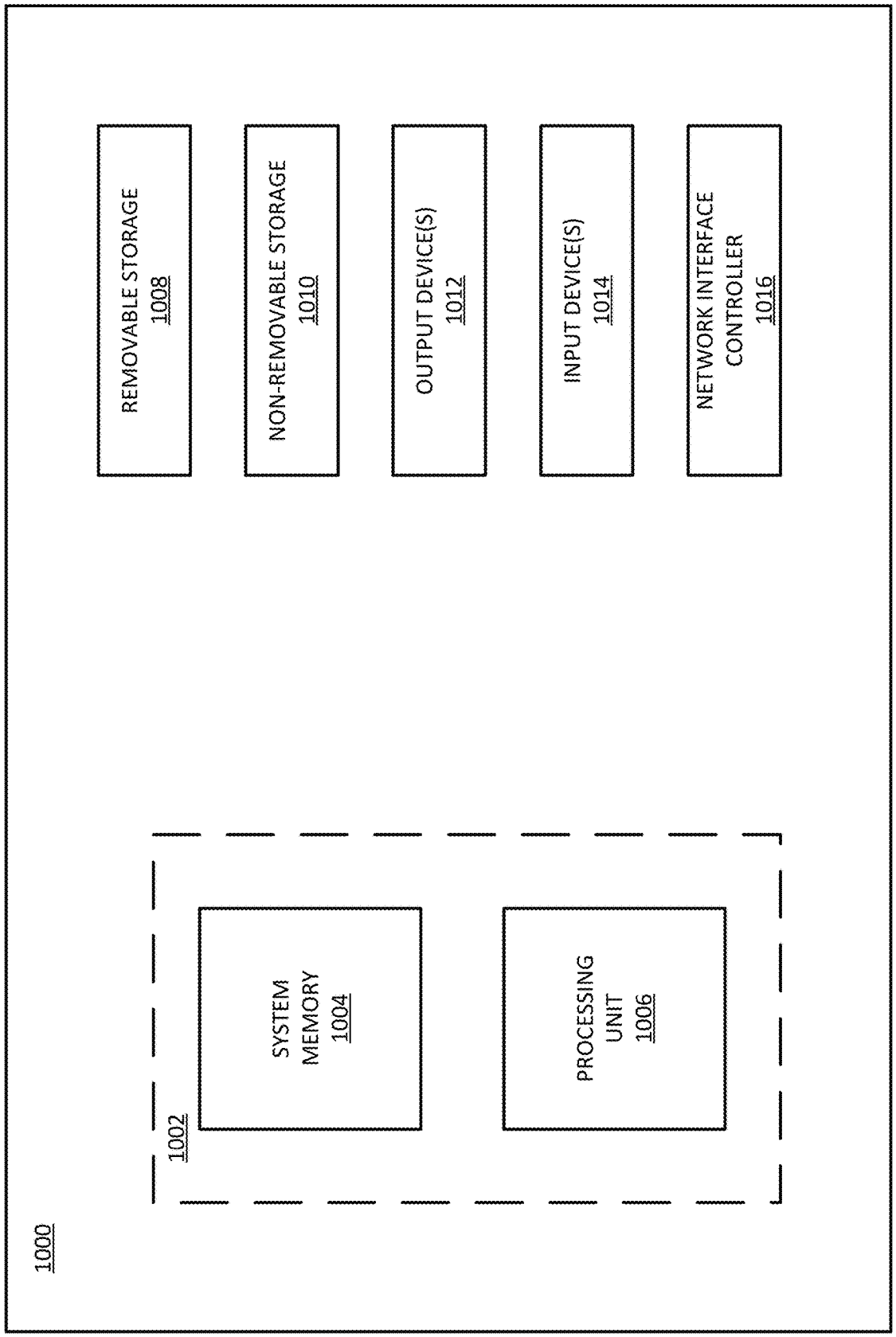
FIG. 10 illustrates an example computing device upon which embodiments of the invention may be implemented.

When the logical operations described herein are implemented in software, the process may execute on any type of computing architecture or platform. Such a computing device 1000 as shown in FIG. 10 can be the same or comprise part of a computing device, radar system, or processor as described above. For example, referring to FIG. 10, an example computing device 1000 upon which embodiments of the invention may be implemented is illustrated. The computing device 1000 can optionally be a mobile computing device such as a laptop computer, a tablet computer, a mobile phone and the like. The computing device 1000 may include a bus or other communication mechanism for communicating information among various components of the computing device 1000. In its most basic configuration, computing device 1000 typically includes at least one processing unit 1006 and system memory 1004. Depending on the exact configuration and type of computing device, system memory 1004 may be volatile (such as random access memory (RAM)), non-volatile (such as read-only memory (ROM), flash memory, etc.), or some combination of the two. This most basic configuration is illustrated in FIG. 10 by dashed line 1002. The processing unit 1006 may be a standard programmable processor that performs arithmetic and logic operations necessary for operation of the computing device 1000.

Computing device 1000 may have additional features/functionality. For example, computing device 300 may include additional storage such as removable storage 1008 and non-removable storage 1010 including, but not limited to, magnetic or optical disks or tapes. Computing device 1000 may also contain network connection(s) 1016 that allow the device to communicate with other devices. Computing device 1000 may also have input device(s) 1014 such as a keyboard, mouse, touch screen, etc. Output device(s) 1012 such as a display, speakers, printer, etc. may also be included. The additional devices may be connected to the bus in order to facilitate communication of data among the components of the computing device 1000. All these devices are well known in the art and need not be discussed at length here.

The processing unit 1006 may be configured to execute program code encoded in tangible, computer-readable media. Computer-readable media refers to any media that is capable of providing data that causes the computing device 1000 (i.e., a machine) to operate in a particular fashion. Various computer-readable media may be utilized to provide instructions to the processing unit 1006 for execution. Common forms of computer-readable media include, for example, magnetic media, optical media, physical media, memory chips or cartridges, or any other non-transitory medium from which a computer can read. Example computer-readable media may include, but is not limited to, volatile media, non-volatile media and transmission media. Volatile and non-volatile media may be implemented in any method or technology for storage of information such as computer readable instructions, data structures, program modules or other data and common forms are discussed in detail below. Transmission media may include coaxial cables, copper wires and/or fiber optic cables, as well as acoustic or light waves, such as those generated during radio-wave and infra-red data communication. Example tangible, computer-readable recording media include, but are not limited to, an integrated circuit (e.g., field-programmable gate array or application-specific IC), a hard disk, an optical disk, a magneto-optical disk, a floppy disk, a magnetic tape, a holographic storage medium, a solid-state device, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices.

In an example implementation, the processing unit 1006 may execute program code stored in the system memory 1004. For example, the bus may carry data to the system memory 1004, from which the processing unit 1006 receives and executes instructions. The data received by the system memory 1004 may optionally be stored on the removable storage 1008 or the non-removable storage 1010 before or after execution by the processing unit 1006.

Computing device 1000 typically includes a variety of computer-readable media. Computer-readable media can be any available media that can be accessed by device 1000 and includes both volatile and non-volatile media, removable and non-removable media. Computer storage media include volatile and non-volatile, and removable and non-removable media implemented in any method or technology for storage of information such as computer readable instructions, data structures, program modules or other data. System memory 1004, removable storage 1008, and non-removable storage 1010 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 1000. Any such computer storage media may be part of computing device 1000.

It should be understood that the various techniques described herein may be implemented in connection with hardware or software or, where appropriate, with a combination thereof. Thus, the methods and apparatuses of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computing device, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

The techniques for detecting sign language gestures by a radar sensor alone or a radar sensor and a camera as used in a system for radar-based communication and interpretation of sign languages described herein can optionally be implemented with a mobile computing device, such as a laptop computer, tablet computer or mobile phone. Accordingly, the mobile computing device is extremely small compared to conventional devices and is very portable, which allows the mobile computing device to be used wherever needed.

It should be appreciated that the logical operations described herein with respect to the various figures may be implemented (1) as a sequence of computer implemented acts or program modules (i.e., software) running on a computing device, (2) as interconnected machine logic circuits or circuit modules (i.e., hardware) within the computing device and/or (3) a combination of software and hardware of the computing device. Thus, the logical operations discussed herein are not limited to any specific combination of hardware and software. The implementation is a matter of choice dependent on the performance and other requirements of the computing device. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method for radar-based communication and interpretation of sign languages, said method comprising:
    detecting, using a radar system comprising a computing device, sign language gestures, wherein said detected sign language gestures comprise radar data;
    analyzing the radar data using a trained neural network executing on the computing device to determine word or phrases intended by the sign language gestures; and
    outputting the determined words or phrases in a visible or audible format, wherein the radar system comprises a cognitive dual-mode radar system.

2. The method of claim 1, wherein the visible format comprises text, wherein the text is displayed on a display.

3. The method of claim 1, wherein the visible format comprises a graphical representation, wherein the graphical representations comprise emojis and/or pictorial symbols.

4. The method of claim 1, wherein the audible format comprises computer-generated audible words, wherein the computer-generated audible words are generated in any language desired.

5. The method of claim 1, wherein analyzing the radar data using a trained neural network executing on the computing device to determine word or phrases intended by the sign language gestures comprises:
    decomposition of the radar data into gross and fine movements using time-frequency-range analysis of radar measurements;

analysis of the radar data across multiple domains including time-frequency, time-range, and 3D representations;
modeling of time-varying nature of radar data using recurrent neural networks (RNN);
recognition of sequences of gestures; and
enforcement of certain rules that constrain potential sequences of gestures, and enable identification of transition periods between gestures or sequences of gestures.

6. The method of claim 5, wherein time-frequency-range analysis of radar measurements comprises cepstral filtering.

7. The method of claim 5, wherein recognition of sequences of gestures is performed using Connectionist Temporal Classification (CTC).

8. The method of claim 1, wherein detecting, using a radar system comprising a computing device, sign language gestures, wherein said detected sign language gestures comprise radar data comprises detecting the sign language gestures using a plurality of radar systems, wherein the plurality of radar systems each observe the sign language gestures from different angles.

9. The method of claim 1, wherein the sign language gestures are also captured using a plurality of image capture devices, wherein image data from the image data device is processed by the computing device and used with the radar data to determine the word or phrases intended by the sign language gestures, wherein the plurality of image capture devices each capture the sign language gestures from different angles.

10. An apparatus comprised of:
a radar transceiver;
a memory; and
a processor in communication with the memory and the radar transceiver, wherein the processor executes computer-readable instructions stored in the memory that cause the processor to;
detect, using the radar transceiver, sign language gestures, wherein said detected sign language gestures comprise radar data;
analyze the radar data using a trained neural network executing on the computing device to determine word or phrases intended by the sign language gestures; and
outputting the determined words or phrases in a visible or audible format,
wherein the radar transceiver comprises a cognitive dual-mode radar system.

11. The apparatus of claim 10, wherein analyzing the radar data using a trained neural network executing on the computing device to determine word or phrases intended by the sign language gestures comprises the processor executing computer-readable instructions stored in the memory that cause the processor to:
decompose the radar data into gross and fine movements using time-frequency-range analysis of radar data;
analyze the radar data across multiple domains including time-frequency, time-range, and 3D representations;
model time-varying nature of radar data using recurrent neural networks (RNN); recognition of sequences of gestures; and
enforce certain rules that constrain potential sequences of gestures, and enable identification of transition periods between gestures or sequences of gestures.

12. The apparatus of claim 11, wherein time-frequency-range analysis of radar measurements comprises cepstral filtering.

13. The apparatus of claim 11, wherein recognition of sequences of gestures is performed by the processor using Connectionist Temporal Classification (CTC).

14. The apparatus of claim 10, wherein the radar transceiver comprises a plurality of radar transceivers for detecting sign language gestures, wherein each of the plurality of radar transceivers each capture the sign language gestures from different angles.

15. The apparatus of claim 10, further comprising an image capture device, wherein the sign language gestures are also captured using the image capture device, wherein image data from the image data device is processed by the computing device and used with the radar data to determine the word or phrases intended by the sign language gestures.

16. The apparatus of claim 15, wherein the image capture device comprises a plurality of image capture devices, wherein the plurality of image capture devices each capture the sign language gestures from different angles.

17. The apparatus of claim 10, wherein the radar transceiver comprises a cognitive dual-mode radar system.

18. A non-transitory computer program product comprising a computer-readable medium with computer-executable instructions stored thereon, said computer-executable instructions comprising a method for radar-based communication and interpretation of sign languages, said method comprising:
detecting, using a radar system comprising a computing device, sign language gestures, wherein said detected sign language gestures comprise radar data;
analyzing the radar data using a trained neural network executing on the computing device to determine word or phrases intended by the sign language gestures; and
outputting the determined words or phrases in a visible or audible format, wherein analyzing the radar data using a trained neural network executing on the computing device to determine word or phrases intended by the sign language gestures comprises:
decomposition of the radar data into gross and fine movements using time-frequency-range analysis of radar measurements, wherein the time-frequency-range analysis of radar measurements comprises cepstral filtering;
analysis of the radar data across multiple domains including time-frequency, time-range, and 3D representations;
modeling of time-varying nature of radar data using recurrent neural networks (RNN);
recognition of sequences of gestures performed using Connectionist Temporal Classification (CTC); and
enforcement of certain rules that constrain potential sequences of gestures, and enable identification of transition periods between gestures or sequences of gestures.

* * * * *